United States Patent [19]

Mattelmaki

[11] Patent Number: 5,149,448
[45] Date of Patent: Sep. 22, 1992

[54] METHOD AND APPARATUS FOR THICKENING LIME SLUDGE

[75] Inventor: Esko Mattelmaki, Varkaus, Finland

[73] Assignee: A. Ahlstrom Corporation, Karhula, Finland

[21] Appl. No.: 688,086

[22] Filed: Apr. 22, 1991

[30] Foreign Application Priority Data

Apr. 25, 1990 [FI] Finland ................................ 902064

[51] Int. Cl.$^5$ ...................... B01D 33/06; B01D 33/46
[52] U.S. Cl. .................................... 210/784; 210/391;
210/396; 210/402; 210/408; 210/413; 210/777;
210/791; 210/797
[58] Field of Search ............. 210/193, 402, 406, 408,
210/409, 413, 777, 784, 797, 217, 391, 393, 396,
791; 162/60

[56] References Cited

U.S. PATENT DOCUMENTS

| | | |
|---|---|---|
| 2,403,021 | 7/1946 | Peterson et al. .................... 210/784 |
| 2,839,194 | 6/1958 | Lopker et al. ...................... 210/784 |
| 3,075,646 | 1/1963 | Giesse ................................. 210/391 |
| 3,521,751 | 7/1970 | Holthuis ............................. 210/797 |
| 4,303,524 | 12/1981 | Richards et al. .................... 210/408 |
| 4,547,295 | 10/1985 | Carr, Jr. et al. .................... 210/777 |
| 4,725,292 | 2/1988 | Williams .............................. 55/96 |
| 4,795,558 | 1/1989 | LaValley ............................ 210/409 |
| 4,952,325 | 8/1990 | Clifford ............................. 210/797 |
| 4,995,991 | 2/1991 | Ljokkoi et al. ...................... 210/797 |

Primary Examiner—Robert A. Dawson
Assistant Examiner—Sun Uk Kim
Attorney, Agent, or Firm—Nixon & Vanderhye

[57] ABSTRACT

A drum filter for thickening lime sludge in which the lime sludge is thickened on a filter layer (precoat) formed by the lime sludge on the filter periphery. The filter is provided with high pressure liquid nozzles continuously reciprocating in the longitudinal direction of the drum in such a way that, during each rotation of the drum, part of the filtering layer is continuously detached and drops into a vat containing the lime sludge.

19 Claims, 1 Drawing Sheet

METHOD AND APPARATUS FOR THICKENING LIME SLUDGE

BACKGROUND AND SUMMARY OF THE INVENTION

The present invention relates to a method of and an apparatus for thickening lime sludge with a drum filter according to which lime sludge is thickened on a filtering layer formed of the lime sludge on the surface of a filter drum partly immersed in a vat containing lime sludge.

Conventionally, a lime sludge having a dry-solids content of approximately 25% is thickened to a dry-solids content of 70-85% with a drum vacuum filter, prior to supplying the lime sludge to a lime sludge reburning kiln. At the beginning of the filtering process, a precoat filter layer of the lime sludge is formed on the surface of the filter drum, the thickness of the layer normally being about 10-20 mm. A scraper is used for scraping off the dried lime sludge from the surface of the precoat. The dried lime sludge falls onto a conveyor and further onto a feed screw which introduces the dried lime sludge into a lime sludge reburning kiln.

The surface layer of the precoat becomes clogged while the filtering proceeds and it must be removed from time to time. The method normally used is to move an automatic scraper gradually inwards according to a predetermined program whereby the clogged surface layer is removed. After the scraper has moved in several steps closer to the drum the whole precoat is removed and a new precoat formed.

All the movements of the scraper described above, and the removal of the precoat from the surface of the drum, result in disturbances in the operation of the lime sludge reburning kiln. After the scraper has moved, the filtering of the lime sludge is more efficient and the lime sludge volume larger for a while. Usually also the dry-solids content of the lime sludge is higher after a movement of the scraper, which result in a change in the operation of the lime sludge reburning kiln. When the whole precoat is renewed the supply of lime sludge to the kiln is stopped for a while which causes a major disturbance in the kiln. Typically, the precoat is replaced once a shift or three times during twenty-four hours. During a longer period of time, the filter cloth becomes so badly clogged that it must be washed either with an acid or with a high-pressure washer. This operation also causes a disturbance, and subsequent reduction in production, of the lime sludge reburning kiln.

A characteristic feature of the method of the present invention resides in the continuous removal of a strip of lime sludge at a time from the filtering layer by means of a liquid jet, preferably reciprocating continuously in the longitudinal direction of the drum, parallel to its axis of rotation.

A characteristic feature of the apparatus of the invention is that at least one nozzle is provided under the scraper and continuously reciprocable in the longitudinal direction of the drum to effect sludge removal.

High-pressure nozzles (e.g. two) are provided under the scraper, mounted in such a way that one of the nozzles breaks the precoat and drops it into the vat and the other nozzle washes the filter cloth clean. The pressure of the water issuing from the nozzles is approx. 50-100 bar which gives a very good cleaning effect. Each nozzle spreads the jet in such a way that the precoat is removed from a strip of about 10-50 mm in width of the drum, and the same area of filter cloth is washed at that time.

The washing nozzles are installed in a rack designed for displacing the nozzles in the lateral direction. The nozzles are continuously reciprocated in the longitudinal direction of extension of the drum which continuously renews the precoat and washes the filter cloth.

Advantages of continuous high-pressure water scraping are: (1) The dry-solids content of the lime sludge from the lime sludge filter to the lime sludge reburning kiln is maintained continuously uniform, allowing constant operation of the kiln. (2) A change of precoat is not necessary as the precoat is renewed continuously a strip at a time. Disturbances in the reburning kiln due to a change of precoat are thus avoided. (3) There is no need to interrupt filtering for washing of the filter cloth.

It is the primary object of the present invention to provide an improved method and an apparatus for thickening lime sludge.

DETAILED DESCRIPTION OF THE DRAWINGS

Figure 1:
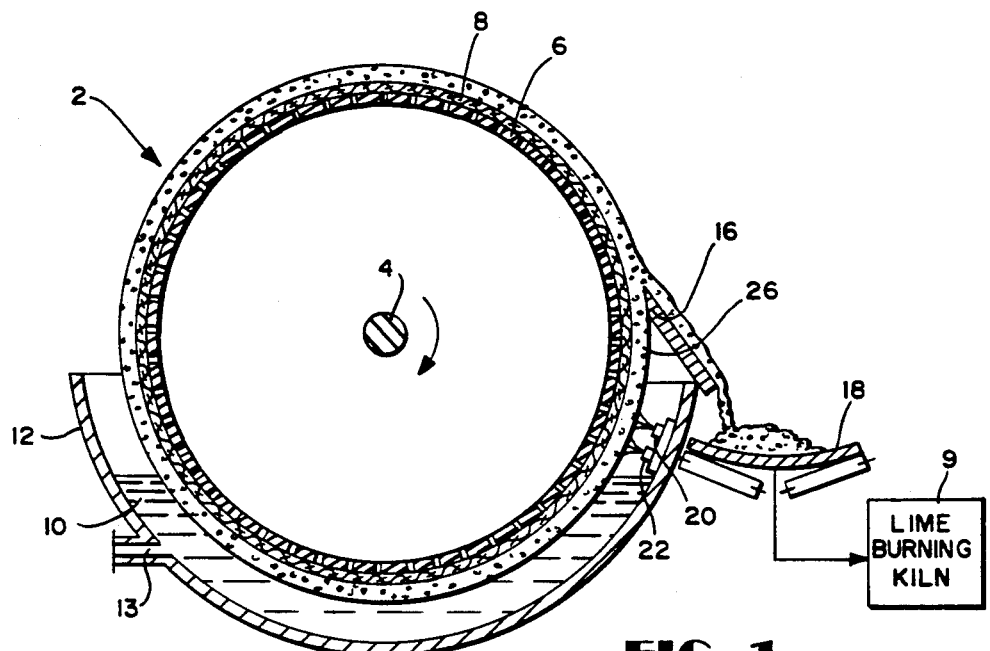
FIG. 1 is a cross-sectional view of exemplary apparatus according to the invention.

The drawings illustrate a drum vacuum filter comprising a drum 2 mounted on a shaft 4 for rotation about a substantially horizontal axis. The shaft 4 is rotated by drive 3. The shell of the drum is composed of a perforated plate 6 covered with a filter cloth 8. The drum 2 is partly immersed in a vat 12 containing lime sludge 10, the vat being provided with an inlet 13 through which lime sludge is introduced into the vat with a dry-solids (consistency) content of about 20-25%. The hollow interior of the drum 2 is connected to a vacuum system 7 through one end of the shaft 4, i.e. the hollow end 14, by a method known per se.

A stationary scraper 16 is provided adjacent to the drum 2, extending from one end of the drum 2 to the other, for removing dried lime sludge from the surface of the drum 2 (surface of cloth 8) and for guiding it onto an adjacent belt conveyor 18 which transports it to a lime sludge reburning kiln 9.

Figure 2:
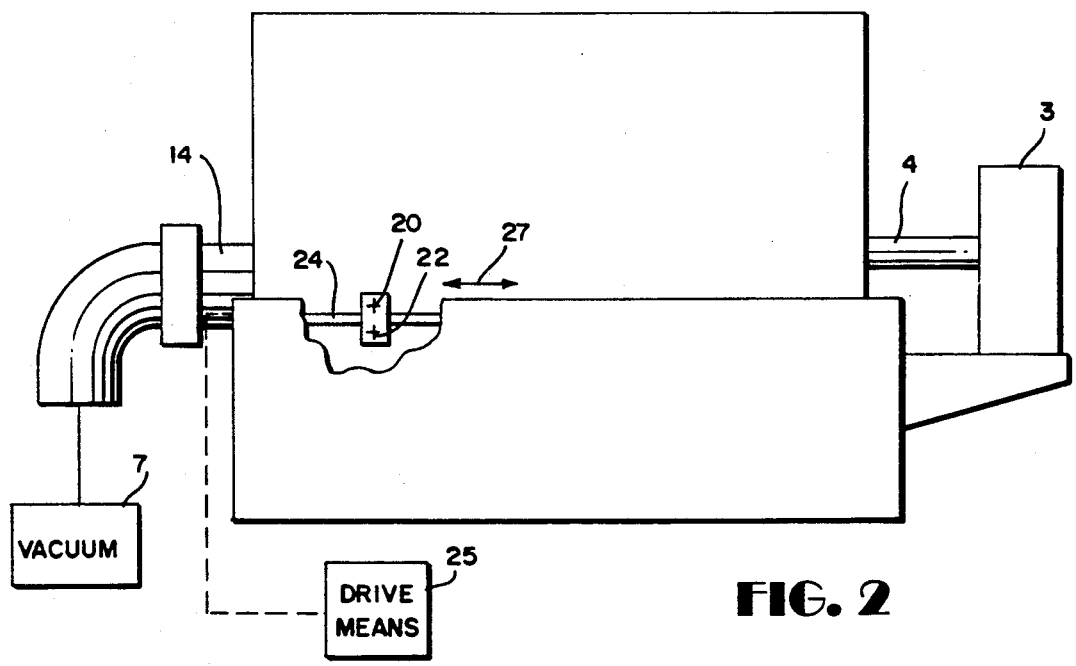
FIG. 2 is a side view of the apparatus partly in section.

Preferably, there are two high-pressure washer nozzles 20 and 22 disposed one on top of the other and under the scraper 16 and both mounted to be reciprocably displaceable along a rod or bar 24 (FIG. 2) extending in the longitudinal direction of the drum 2. The nozzles 20, 22 are connected by a method known per se to a drive means 25 which continuously reciprocate the nozzles 20, 22 in the longitudinal direction (see arrows 27) of the drum 2 from one end to the other, parallel to the horizontal axis of rotation defined by shaft 4. The nozzles 20, 22 are mounted by rod 24 above the level of slurry in the vat 12.

When the drum 2 rotates down into the lime sludge in the vat the lime sludge adheres in a layer onto the filter cloth 8. A partial vacuum in the drum 2 provides the pressure difference which extracts liquid from the lime sludge through the filter cloth 8. When the immersed surface of the drum is rotated up from the lime sludge the partial vacuum effects liquid extraction from the lime sludge layer whereby the dry-solids content of the lime sludge increases remarkably. The liquid separated from the lime sludge, i.e. white liquor, is removed via the hollow shaft 14 of the drum 2 via vacuum 7.

The thickening of lime sludge is preferably performed by means of a precoat layer 26 formed on the surface of a filter drum 2, i.e. the thickening takes place through both the filter cloth 8 and a filtering lime sludge layer formed on the filter cloth 8. The scraper 16 scrapes lime sludge of a dry-solids content of about 70–85% from the surface of the precoat 26 and drops it onto a belt conveyor 18. The scraping tip of the scraper 16 is kept at a certain constant distance from the surface of the drum 2 so as to maintain a precoat thickness of approx. 10–15 mm.

During each rotation of the drum 2, the displaceable nozzles 20 and 22 move under the scraper 16, continuously removing a part of the precoat layer 26. The water jet from the upper nozzle 20 breaks the precoat 26 and causes it to drop into the vat 12, and the lower nozzle 22 washes the filter cloth 8 clean. The nozzles 20, 22 are provided with a high enough pressure, for example about 50–100 bar, so that good cleaning is achieved. The nozzles 20, 22 spread the water jet in such a way that the precoat 26 is removed from a strip of about 10–50 mm in width at a time, and the same area (width) of filter cloth 8 is washed at that time.

While the invention has been described in connection with what is presently considered to be the most practical and preferred embodiment, it is to be understood that the invention is not to be limited to the disclosed embodiment, but on the contrary, is intended to cover various modifications and equivalent apparatus methods included within the spirit and scope of the appended claims.

I claim:

1. A method of thickening lime sludge utilizing a drum filter surface which rotates about a substantially horizontal axis into operative association with lime sludge in a vat, comprising the steps of continuously:
   (a) rotating the drum about its axis so that the drum filter surface comes in contact with lime sludge in the vat so that a precoat filter layer is formed on the drum filter, and a dried layer of lime sludge collects on the precoat layer;
   (b) scraping the dried layer of lime sludge from the drum filter; and then
   (c) directing a first liquid jet against a strip of the precoat above the lime sludge in the vat so as to remove that strip of the precoat layer from the drum, by continuously reciprocating the first jet in a dimension parallel to the axis of rotation of the drum, so as to remove a strip of precoat at a time.

2. A method as recited in claim 1 wherein step (c) is practiced so as to direct the removed strip of precoat layer into the vat.

3. A method as recited in claim 2 comprising the further step (d), after step (c), of directing a second liquid jet against the drum to effect cleaning thereof.

4. A method as recited in claim 3 wherein the drum is covered by a filter cloth, and wherein step (d) is practiced by directing the second jet against the filter cloth.

5. A method as recited in claim 3 wherein steps (c) and (d) are practiced by directing the liquid jets against the precoat and drum under a pressure between about 50–100 bar.

6. A method as recited in claim 5 wherein step (a) is practiced with a sludge in the vat having a solids consistency of about 20–25%, and step (b) effects scraping of a sludge with a consistency of about 70–85%.

7. A method as recited in claim 5 wherein steps (c) and (d) are practiced so that a strip about 10–50 mm wide is impacted by the liquid jets at any one time.

8. A method as recited in claim 1 comprising the further step (d), after step (c), of directing a second liquid jet against the drum to effect cleaning thereof, the second liquid jet being continuously reciprocated with the first liquid jet.

9. A method as recited in claim 8 wherein step (c) is practiced so as to direct the removed strip of precoat layer into the vat.

10. A method as recited in claim 8 wherein the drum is covered by a filter cloth, and wherein step (d) is practiced by directing the second jet against the filter cloth.

11. A method as recited in claim 10 wherein steps (c) and (d) are practiced by directing the liquid jets against the precoat and drum under a pressure between about 50–100 bar.

12. A method as recited in claim 8 wherein step (a) is practiced with a sludge in the vat having a solids consistency of about 20–25%, and step (b) effects scraping of a sludge with a consistency of about 70–85%.

13. A method as recited in claim 12 wherein the drum interior is hollow, and comprising the further step of connecting the drum hollow interior to a source of vacuum to facilitate formation of dried lime sludge on the drum.

14. A method as recited in claim 8 wherein steps (c) and (d) are practiced so that a strip about 10–50 mm wide is impacted by the liquid jets at any one time as they are continuously reciprocated.

15. A drum filter assembly for thickening lime sludge, comprising:
   a filter drum having a peripheral surface at least partially immersed in a vat containing lime sludge, and a hollow interior, and mounted by a shaft for rotation about a generally horizontal axis in a direction of rotation;
   a scraper mounted at a position engaging lime sludge which dries on the peripheral surface of the drum, for scraping it off from the peripheral surface;
   at least one liquid jet nozzle mounted above the lime sludge in the vat and under said scraper, past said scraper in the direction of rotation of said drum, for directing liquid under high pressure toward said drum peripheral surface; and
   means for continuously reciprocating said at least one nozzle in a dimension parallel to the axis of rotation of said drum.

16. An assembly as recited in claim 15 wherein said at least one liquid jet nozzle comprises a first nozzle mounted at a first position, and a second nozzle mounted at a second position, said second position being further from said scraper in the direction of rotation of said drum than said first position, so that a liquid jet from said first nozzle removes precoat lime sludge from said drum, and a liquid jet from said second nozzle cleans the drum peripheral surface.

17. An assembly as recited in claim 16 wherein the drum peripheral surface is covered with a filter cloth, and wherein said hollow drum interior is connected to a source of vacuum.

18. An assembly as recited in claim 16 wherein said nozzles are constructed, and spaced with respect to said drum, such that a liquid jet issuing therefrom impacts an area of said drum about 10–50 mm wide.

19. An assembly as recited in claim 16 wherein said nozzles are mounted above said vat so that precoat removed from said drum by said first jet falls into said vat.

* * * * *